G. P. SMITH.
LOCK FOR AUTOMOBILE CLUTCH LEVERS.
APPLICATION FILED MAY 13, 1919.
1,319,495.
Patented Oct. 21, 1919.
2 SHEETS—SHEET 1.
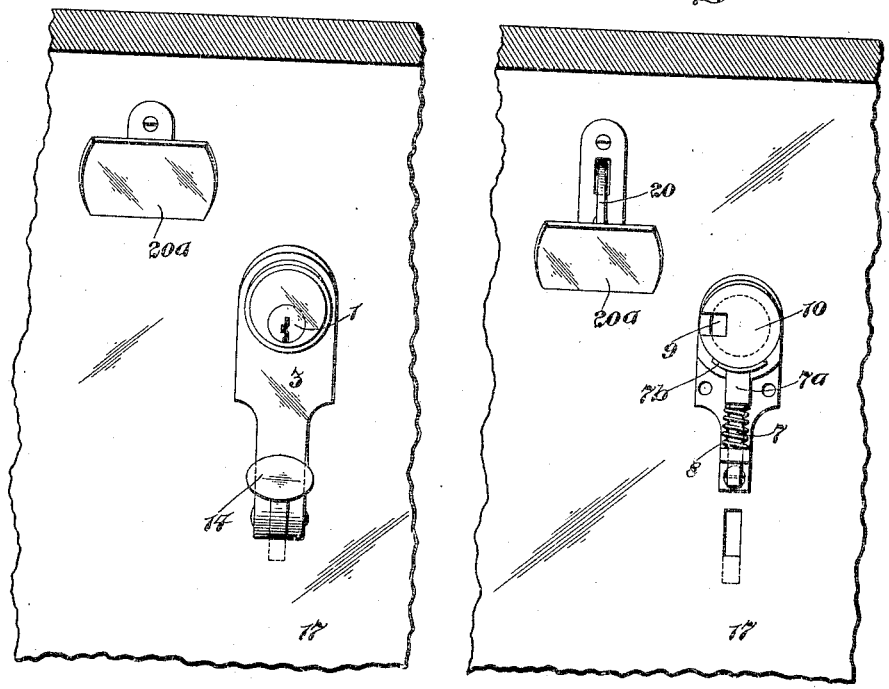
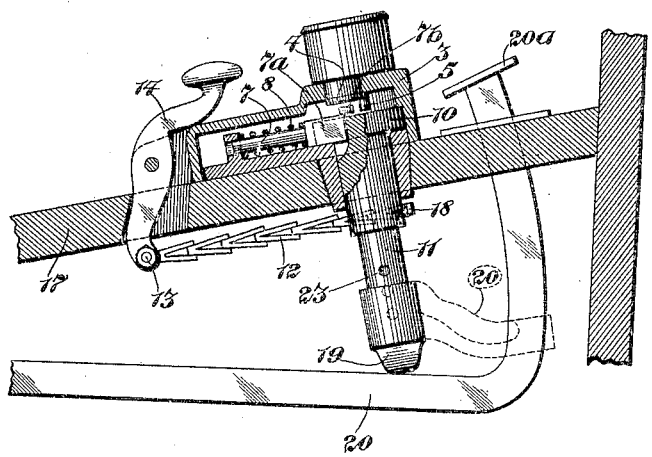
Attest.
Charles A. Becker.
Inventor.
George P. Smith,
by Small n Small
His Attorneys.

G. P. SMITH.
LOCK FOR AUTOMOBILE CLUTCH LEVERS.
APPLICATION FILED MAY 13, 1919.
1,319,495. Patented Oct. 21, 1919.
2 SHEETS—SHEET 2.
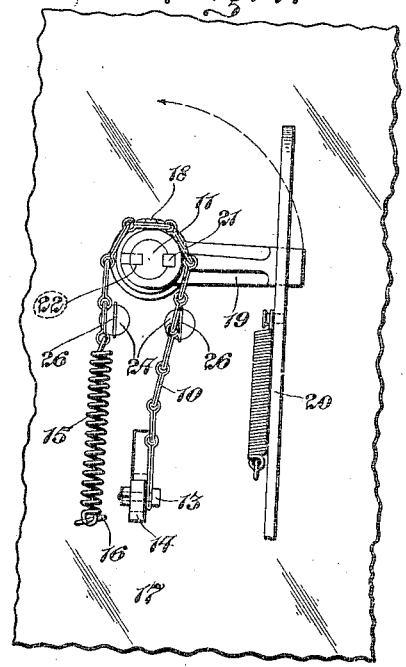
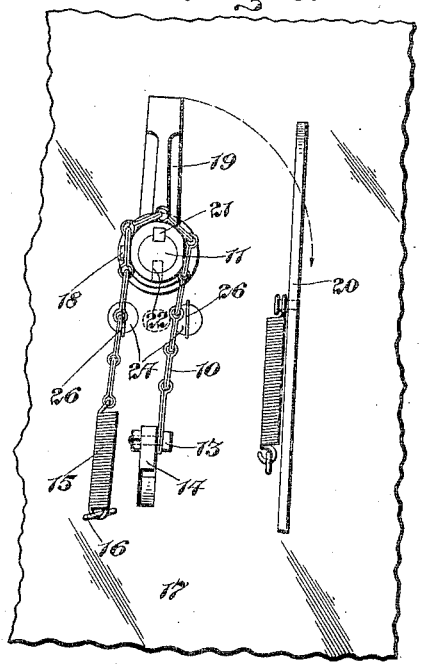
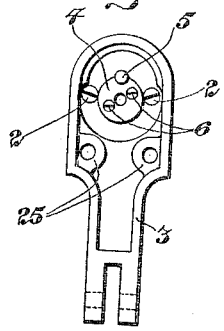
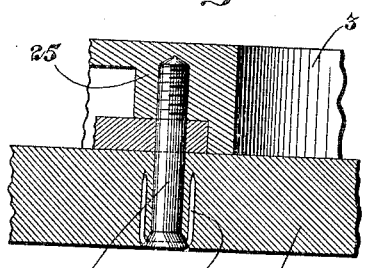
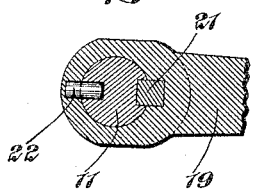
Attest.
Charles A. Becker.
Inventor:
George P. Smith,
by Small & Small
His Attorneys.

UNITED STATES PATENT OFFICE.

GEORGE P. SMITH, OF EAST ST. LOUIS, ILLINOIS.

LOCK FOR AUTOMOBILE CLUTCH-LEVERS.

1,319,495.    Specification of Letters Patent.    Patented Oct. 21, 1919.

Application filed May 13, 1919. Serial No. 296,869.

*To all whom it may concern:*

Be it known that I, GEORGE P. SMITH, a citizen of the United States, residing at East St. Louis, in the State of Illinois, have invented a new and useful Lock for Automobile Clutch-Levers, of which the following is a specification.

This invention relates to devices for locking the clutch-lever of an automobile when the same is depressed, whereby the engine is disconnected from the drive shaft and the prime object of this invention is to afford a lock which shall be more simple, stronger and less expensive to make and install than the locks covered by my Patents Nos. 1,066,539 of July 8, 1913, and 1,084,237 of January 13, 1914, which are intended for the same purpose.

Other objects and advantages will be made apparent upon consideration of the following portions of the specification and the appended claims.

Referring to the annexed drawings, wherein like numerals refer to like parts throughout the several views, Figure 1 is a top plan view of the complete lock as installed in the floor of an automobile, showing its disposition relative to the clutch-pedal; Fig. 2 is a top-plan view corresponding to Fig. 1, except that the housing of the lock and the lever element have been removed to disclose the interior mechanism; Fig. 3 is a side elevation, partly in section, of the complete lock, showing its locking-arm element positioned so as to retain the clutch-lever against upward movement; Figs. 4 and 5 are plan views of the lock as viewed from beneath the floor of the car, the former showing the locking-arm element engaged with the clutch-lever and the latter showing said element in the position assumed when the lock is released; Fig. 6 a plan view of the interior of the housing shown in Fig. 1, depicting the cam for retracting the spring-pressed bolt shown in Figs. 2 and 3; Fig. 7 a detail sectional view, on enlarged scale, depicting one of the screws preferably used for fastening the lock to the floor of the car and the manner of preventing the removal of said screws by closing the slot in the head thereof; and Fig. 8 a detail sectional view showing the manner of fastening the locking-arm element of the shaft by which it is moved into engagement with the clutch-lever.

In carrying out the invention I employ a "Yale," "Corbin" or other standard key-operated barrel 1, the casing of which is affixed by means of screws 2 (Fig. 6) to the housing 3 and a cam, consisting of a disk 4 carrying a pin 5, is secured to the end of the barrel proper by screws 6. Disposed beneath said housing is a bolt 7 projecting through and actuated by a helical spring 8, said bolt having an enlarged, square-cut head $7^a$ which enters slot 9 of disk 10 when the latter is brought into register by rotation of shaft 11 formed integral with said disk. The head of said bolt is provided with an upstanding curved flange $7^b$ against which pin 5 bears when barrel 1 is rotated for the purpose of releasing the lock. Shaft 11 is provided with a thickened upper portion around which a flat chain 12 is passed and by reference to Figs. 4 and 5 it will be noted that one extremity of said chain is secured by bolt 13 to the lower end of lever 14 while its other extremity engages helical spring 15 which is affixed at 16 to the flooring 17. A screw 18 projected through one of the links of chain 12 secures the latter to shaft 11 and the lower extremity of said shaft carries an arm 19 for retention of the clutch-lever 20 when the same is depressed as shown in Figs. 3 and 4, said arm being adjustable in various positions by means of a key 21 and, after adjustment, fixed against removal by the insertion of a pin 22 in one of apertures 23 which is then closed over the end of said pin by several blows from a hammer (Fig. 8). The lock is secured to the floor of the car by screws 24 which engage threaded bases 25 cast integral with the under surface of housing 3 and by reference to Fig. 7 it will be noted that the removal of said screws is virtually rendered impossible by closing the slot in the head thereof with a staple 26 of piano-wire or other specially hardened steel.

The operation of the lock is as follows: When it is desired to leave the car without an attendant clutch-lever 20 is first depressed and chain 12 then drawn rearwardly through the agency of lever 14. This results in rotating shaft 11 and in bringing arm 19 from the position shown in Fig. 5 to that shown in Figs. 3 and 4 so that, upon removal of the foot from pedal $20^a$, the clutch-lever will contact with and be retained by said arm, the latter being locked in such position by the entrance of bolt 7 within slot 9 of disk 10 which is rotated in unison with shaft 11. To release the clutch-lever, a key is inserted in the key-slot of barrel 1 and turned so as to rotate disk 4 and thus force bolt 7 rearwardly through the agency of pin 5 acting against flange 7$^b$ affixed to the head of said bolt, whereupon the pull of spring 15 against chain 12 will serve to rotate shaft 11 and thus return arm 19 to the position shown in Fig. 5.

Having thus fully described the invention, what I claim as new and desire to secure by Letters-Patent is:—

1. A device for locking the clutch-lever of an automobile, comprising a housing affixed to the floor of the vehicle adjacent to the upper extremity of said lever, a key-operated cylinder secured to said housing, a cam affixed to an extremity of said cylinder, a shaft extending through said floor surmounted by a slotted disk disposed beneath said cam, a spring-pressed bolt within said housing adapted to engage the slot of said disk, a member affixed to said bolt affording a bearing surface for said cam, whereby said bolt is retracted upon rotation of said cylinder, an arm affixed to the lower extremity of said shaft, mechanism for rotating said shaft to position said arm across the path of movement of said lever, and automatic means for withdrawing said arm coincident with the retraction of said bolt by said cam.

2. A device for locking the clutch-lever of an automobile, comprising a housing affixed to the floor of the vehicle adjacent to the upper extremity of said lever, a key-operated cylinder secured to said housing, a cam affixed to an extremity of said cylinder, a shaft extending through said floor surmounted by a slotted disk disposed beneath said cam, a spring-pressed bolt within said housing adapted to engage the slot of said disk, a member affixed to said bolt affording a bearing surface for said cam, whereby said bolt is retracted upon rotation of said cylinder, an arm affixed to the lower extremity of said shaft, means for adjusting said arm, mechanism for rotating said shaft to position said arm across the path of movement of said lever, devices for preventing the removal of said housing, and automatic means for withdrawing said arm coincident with the retraction of said bolt by said cam.

GEORGE P. SMITH.

Witnesses:
MAYBELLE SCHUMERT,
FRANK G. SMITH.

Copies of this patent may be obtained for five cents each, by addressing the "Commissioner of Patents, Washington, D. C."